(12) United States Patent
Song

(10) Patent No.: US 12,157,447 B2
(45) Date of Patent: Dec. 3, 2024

(54) ACTUATOR FOR BRAKE DEVICE

(71) Applicant: HL MANDO CORPORATION, Pyeongtaek-si (KR)

(72) Inventor: Joon-kyu Song, Seongnam-si (KR)

(73) Assignee: HL MANDO CORPORATION, Pyeongtaek si (KR)

( * ) Notice: Subject to any disclaimer, the term of this patent is extended or adjusted under 35 U.S.C. 154(b) by 317 days.

(21) Appl. No.: 17/636,550

(22) PCT Filed: Aug. 12, 2020

(86) PCT No.: PCT/KR2020/010678
§ 371 (c)(1),
(2) Date: Feb. 18, 2022

(87) PCT Pub. No.: WO2021/040280
PCT Pub. Date: Mar. 4, 2021

(65) Prior Publication Data
US 2022/0281429 A1 Sep. 8, 2022

(30) Foreign Application Priority Data
Aug. 29, 2019 (KR) .................. 10-2019-0106589

(51) Int. Cl.
*B60T 13/74* (2006.01)
*F16D 65/18* (2006.01)
(Continued)

(52) U.S. Cl.
CPC ............ *B60T 13/746* (2013.01); *F16D 65/18* (2013.01); *F16D 2121/24* (2013.01); *F16D 2125/50* (2013.01); *F16D 2125/52* (2013.01)

(58) Field of Classification Search
CPC ..... B60T 13/746; F16D 65/18; F16D 2121/24
See application file for complete search history.

(56) References Cited

U.S. PATENT DOCUMENTS

| 2011/0095048 | A1 | 4/2011 | Wagner et al. |
| 2013/0270047 | A1* | 10/2013 | Kim ................. F16D 65/18 |
| | | | 188/72.1 |
| 2020/0307539 | A1* | 10/2020 | Jang ................. F16D 65/18 |

FOREIGN PATENT DOCUMENTS

| CN | 104302940 A | * | 1/2015 | ............ B60T 13/741 |
| CN | 106314407 A | * | 1/2017 | |

(Continued)

OTHER PUBLICATIONS

International Search Report (PCT/ISA/210) issued in PCT Application No. PCT/KR2020/010678 dated Nov. 30, 2020 with English Translation.

(Continued)

*Primary Examiner* — Vishal R Sahni
(74) *Attorney, Agent, or Firm* — LEE, HONG, DEGERMAN, KANG & WAIMEY

(57) ABSTRACT

Disclosed herein an actuator for a brake device includes a housing including a motor accommodating portion configured to accommodate a motor, and a gear accommodating portion configured to accommodate a reduction device; a power connection unit connected to the motor; and the reduction device connected to the power connection unit; wherein the reduction device includes a first reduction gear unit connected to the power connection unit and a second reduction gear unit connected to the first reduction gear unit, and the first reduction gear unit is provided as a bevel gear assembly.

4 Claims, 5 Drawing Sheets

(51) Int. Cl.
*F16D 121/24* (2012.01)
*F16D 125/50* (2012.01)
*F16D 125/52* (2012.01)

(56) References Cited

FOREIGN PATENT DOCUMENTS

| | | | | |
|---|---|---|---|---|
| CN | 107035792 A | * | 8/2017 | ........... F16D 55/225 |
| DE | 112010005686 T5 | * | 3/2013 | .............. B60T 1/005 |
| DE | 102018001328 A1 | * | 8/2018 | ........... F16D 55/226 |
| DE | 102018132266 A1 | * | 6/2020 | ........... B60T 13/588 |
| FR | 3086360 A1 | * | 3/2020 | ........... B60T 13/741 |
| KR | 10-1999-0083332 | | 11/1999 | |
| KR | 101688878 B1 | * | 8/2015 | |
| KR | 10-2015-0117116 | | 10/2015 | |
| KR | 10-1836128 | | 3/2018 | |
| KR | 10-1836128 B1 | | 3/2018 | |
| KR | 10-2018-0078062 A | | 7/2018 | |
| KR | 10-2018-0096294 | | 8/2018 | |
| KR | 10-2018-0126107 | | 11/2018 | |
| KR | 10-2019-0047176 | | 5/2019 | |
| KR | 10-2019-0047176 A | | 5/2019 | |

OTHER PUBLICATIONS

Written Opinion (PCT/ISA/237) issued in PCT Application No. PCT/KR2020/010678 dated Nov. 30, 2020.
The State Intellectual Property Office of the People's Republic of China Application Serial No. 202080061128.2, Office Action dated Dec. 18, 2023, 5 pages.
Korean Intellectual Property Office Application No. 10-2019-0106589, Office Action dated Aug. 26, 2024, 4 pages.

* cited by examiner

【FIG. 1】
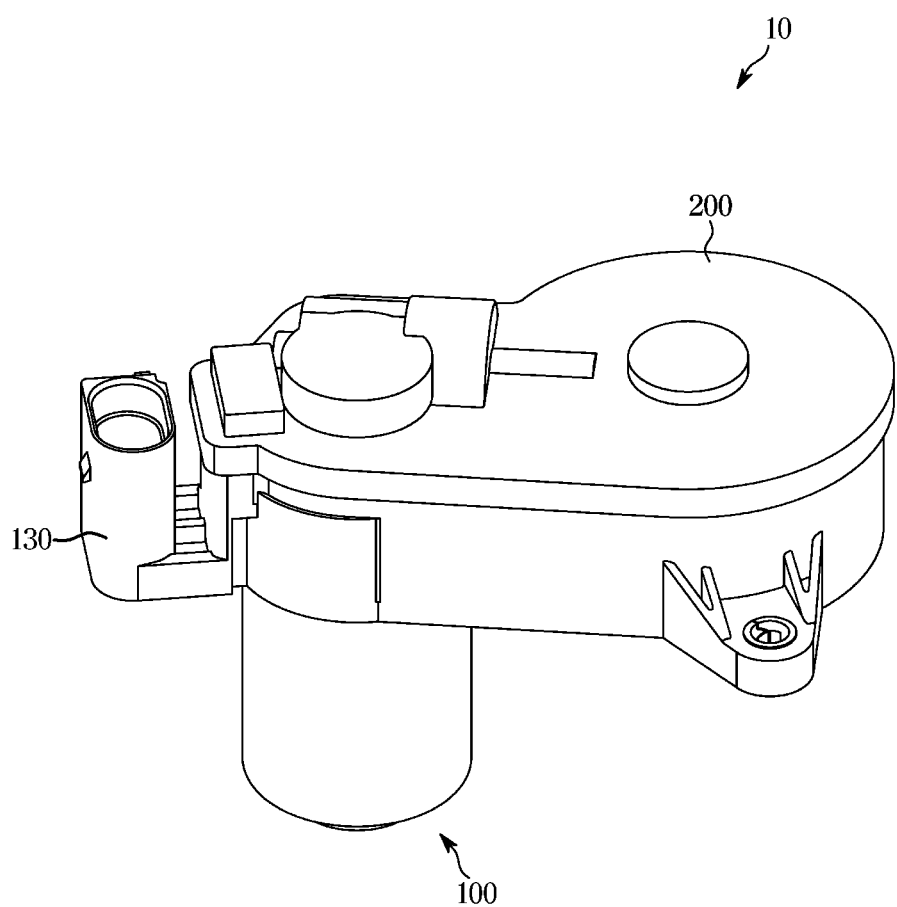

[FIG. 2]
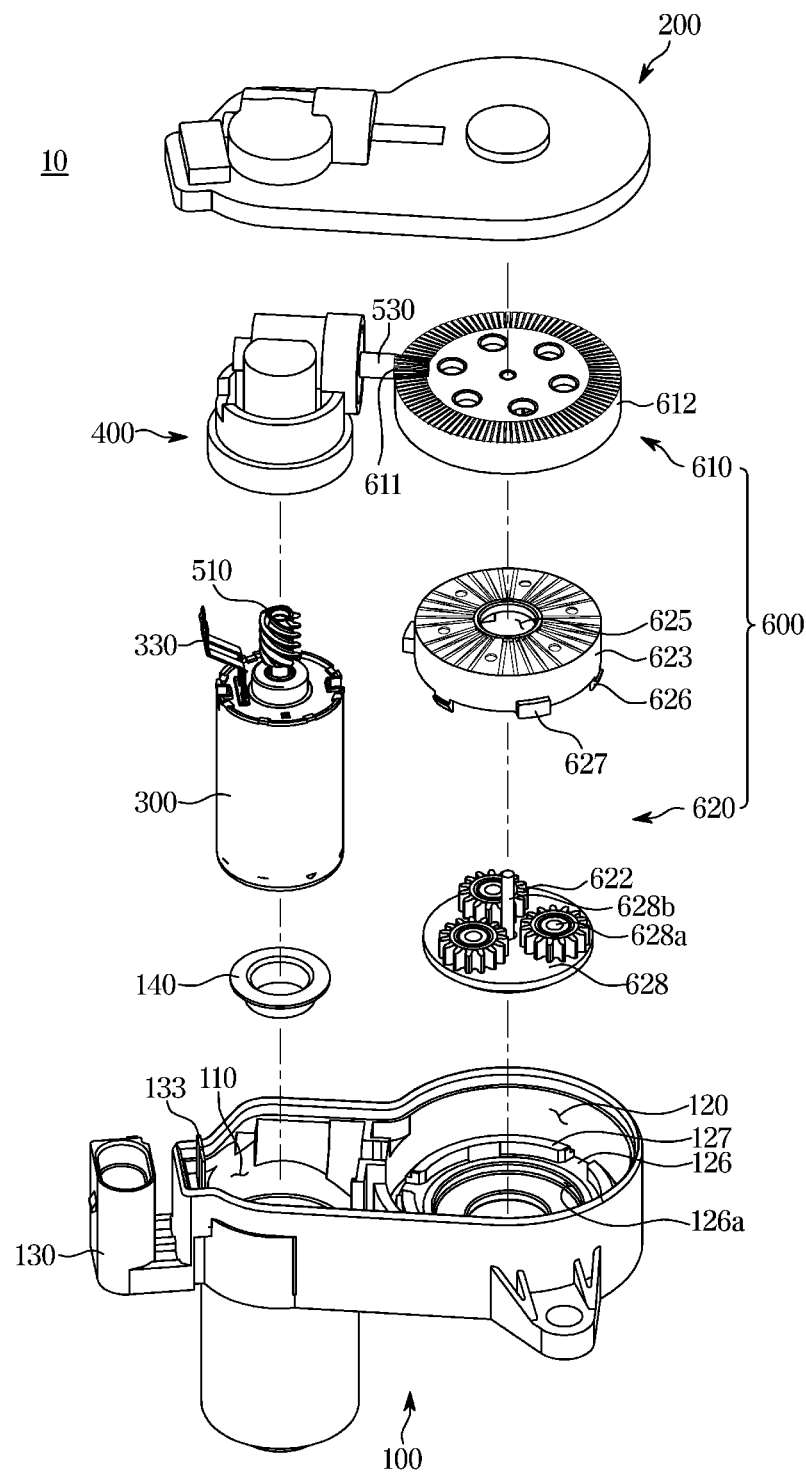

[FIG. 3]
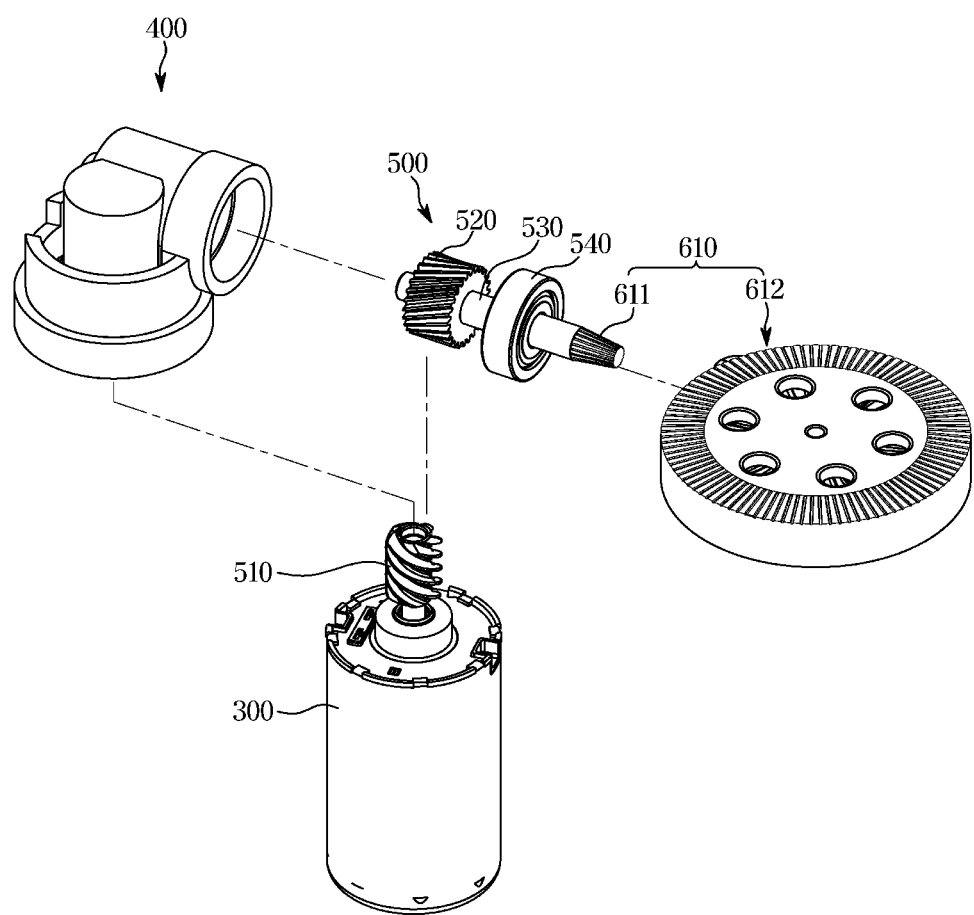

[FIG. 4]
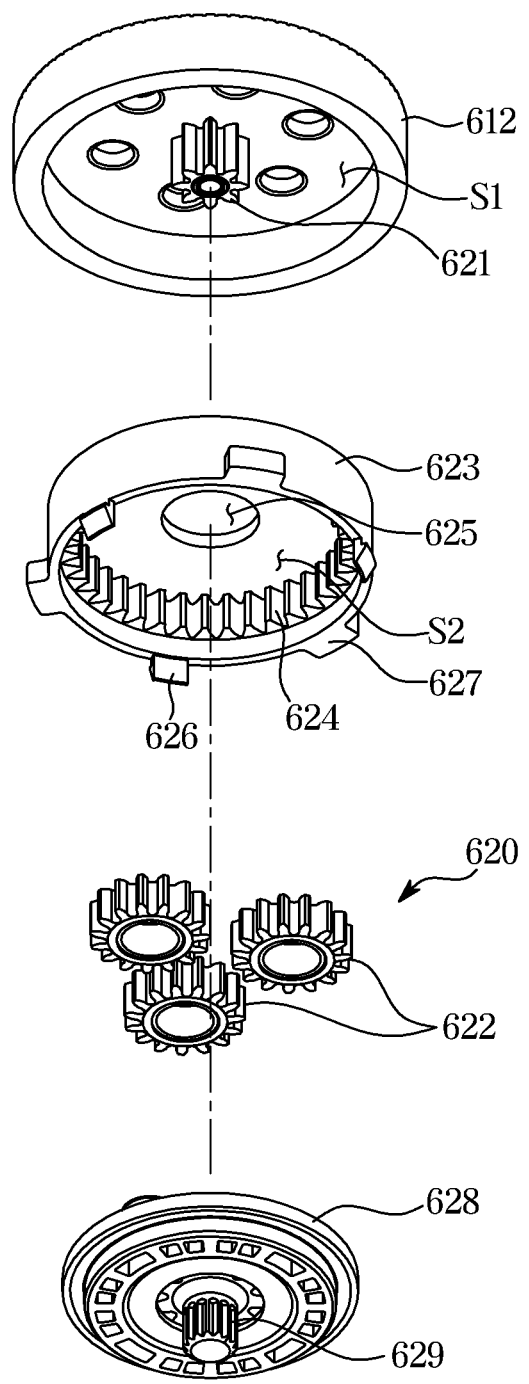

【FIG. 5】
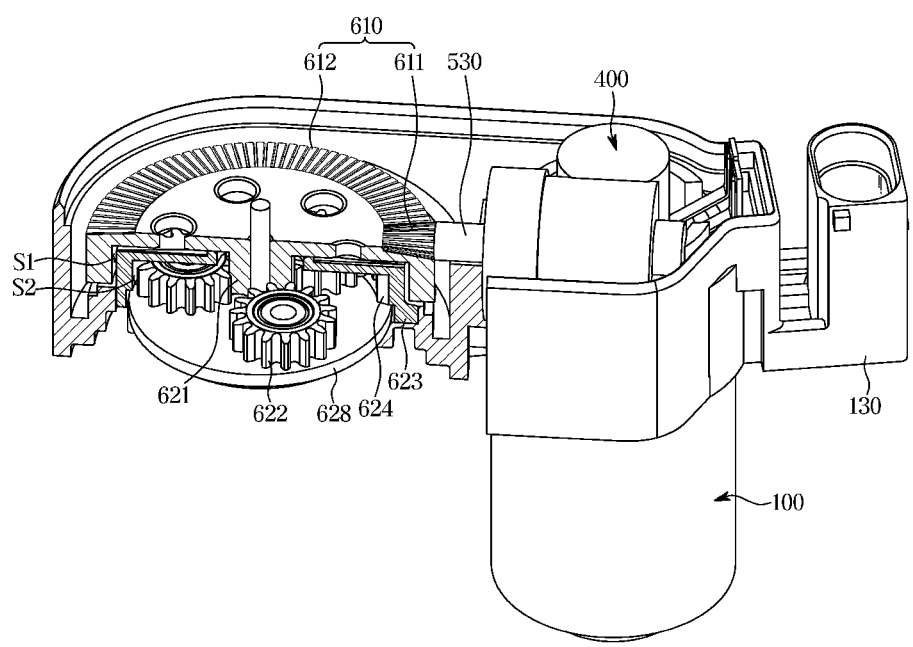

ACTUATOR FOR BRAKE DEVICE

CROSS-REFERENCE OF RELATED APPLICATIONS

This application is the U.S. National Phase under 35 U.S.C. § 371 of International Patent Application No. PCT/KR2020/010678, filed on Aug. 12, 2020, which claims the benefit of Korean Patent Application No. 10-2019-0106589, filed on Aug. 29, 2019, the entire disclosures of each are incorporated by reference herein.

TECHNICAL FIELD

The disclosure relates to an actuator for a brake device, and more particularly, to an actuator for a brake device capable of realizing a parking function by operation of a motor.

BACKGROUND ART

In general, a brake is a device that prevents a vehicle from moving during braking or parking, and serves to hold wheels of the vehicle from rotating.

Recently, an Electronic Parking Brake (EPB) system for electronically controlling the operation of a parking brake has been widely used. The EPB is mounted on a conventional disc brake to perform the function of a parking brake. The EPB includes a cable puller type, a motor-on-caliper (MOC) type and a hydraulic parking brake type.

For example, Korean Patent Publication No. 10-2011-0072877 (Jun. 29, 2011) relates to a MOC-type EPB actuator structure. The document discloses an actuator used in the EPB, in which a motor generating power is connected to an actuator and the power generated from the motor is decelerated using a plurality of gears while increasing torque to transmit to the actuator and a caliper, thereby performing a braking operation.

However, an actuator used in the EPB causes large vibrations and noises, and also has disadvantages in terms of assembly and economic feasibility.

DISCLOSURE

Technical Problem

An aspect of the disclosure is to provide an actuator for a brake device capable of realizing miniaturization and operational stability while having a simple structure by improving the structure of each component, such as a powertrain transmission unit that transmits driving force of a motor and a reduction gear unit that reduces rotational force.

Technical Solution

In accordance with an aspect of the disclosure provides, an actuator for a brake device includes a housing including a motor accommodating portion configured to accommodate a motor, and a gear accommodating portion configured to accommodate a reduction device; a power connection unit connected to the motor; and the reduction device connected to the power connection unit; wherein the reduction device includes a first reduction gear unit connected to the power connection unit and a second reduction gear unit connected to the first reduction gear unit, and the first reduction gear unit is provided as a bevel gear assembly.

The power connection unit includes a power transmission shaft having a predetermined length and provided between the motor and the reduction device; a first helical gear coupled to a rotation shaft of the motor; a second helical gear installed at one end of the power transmission shaft and meshed with the first helical gear; and a bearing portion provided on the power transmission shaft to rotatably support the power transmission shaft.

The first reduction gear unit includes a first bevel gear part provided at the other end of the power transmission shaft; and a second bevel gear part that formed in a cylindrical shape with an open lower portion to have an accommodating space thereinside, and including gear tooth meshed with the first bevel gear part along an upper surface edge.

The first bevel gear part may include gear tooth formed on an outer surface of the other end of the power transmission shaft.

The second reduction gear unit includes a sun gear coupled to a lower center of the second bevel gear part to rotate together with rotation of the second bevel gear part; a plurality of planetary gears meshed with an outer side of the sun gear; a gear mounting part provided with a ring gear on an inner circumference thereof to accommodate the plurality of planetary gears; and a carrier that rotatably supports the plurality of planetary gears and is installed to rotate coaxially with the sun gear, the carrier provided with an output gear for outputting rotational power.

The gear mounting part may be accommodated in the accommodating space of the second bevel gear part, and the plurality of planetary gears that are arranged to mesh with the sun gear and the ring gear may be rotatably provided in an inner space of the gear mounting part.

The gear accommodating portion may be provided with an extension panel to which the gear mounting part is coupled, and a plurality of hook is provided at a lower end of the gear mounting part to be detachably attached to the extension panel.

The extension panel may be provided with a plurality of locking ribs spaced apart from each other by a predetermined distance along a circumferential direction thereof, and a plurality of coupling ribs engaged with the plurality of locking ribs protrudes from a lower outer circumferential surface of the gear mounting part.

The actuator may further include a bracket configured to support the power connection unit from an upper side of the motor and a cover configured to cover a top of the housing.

Advantageous Effects

The actuator for a brake device according to an embodiment of the disclosure may effectively implement a compact size and low-noise operation by using a helical gear and a bevel gear in a power transmission process of the motor.

Furthermore, the actuator for a brake device according to an embodiment of the disclosure may secure compact assembly because the gear mounting part provided with the sun gear, the planetary gear and the ring gear is arranged and meshed inside the second bevel gear part, and leading to improving miniaturization and operation stability of the actuator.

DESCRIPTION OF DRAWINGS

FIG. 1 is a perspective view illustrating an actuator for a brake device according to an embodiment of the disclosure;

FIG. 2 is an exploded perspective view illustrating an actuator for a brake device according to an embodiment of the disclosure;

FIG. 3 is an exploded perspective view illustrating a coupling relationship between a power connection unit and a first reduction gear unit of an actuator for a brake device according to an embodiment of the disclosure;

FIG. 4 is an exploded perspective view illustrating a deceleration device of an actuator for a brake device according to an embodiment of the disclosure; and FIG. 5 is a partially-cut perspective view illustrating an actuator for a brake device according to an embodiment of the disclosure.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a perspective view illustrating an actuator for a brake device according to an embodiment of the disclosure, FIG. 2 is an exploded perspective view illustrating an actuator for a brake device according to an embodiment of the disclosure, FIG. 3 is an exploded perspective view illustrating a coupling relationship between a power connection unit and a first reduction gear unit of an actuator for a brake device according to an embodiment of the disclosure, FIG. 4 is an exploded perspective view illustrating a deceleration device of an actuator for a brake device according to an embodiment of the disclosure, and FIG. 5 is a partially-cut perspective view illustrating an actuator for a brake device according to an embodiment of the disclosure.

Referring to FIGS. 1 to 5, an actuator 10 for a brake device according to an embodiment of the disclosure includes a housing 100 accommodating a motor 300 and a reduction device 600, a power connection unit 500 connected to the motor 300, and a reduction device 600 connected to the power connection unit 500. Furthermore, the actuator 10 for the brake device further includes a bracket 400 that supports the power connection unit 500 on an upper side of the motor 300, and a cover 200 that covers a top of the housing 100.

The housing 100 has a motor accommodating portion 110 in which the motor 300 is accommodated on one side, and a gear accommodating portion 120 in which the speed reduction device 600 is accommodated on the other side. The housing 100 is provided in an open top form in which the motor accommodating portion 110 and the gear accommodating portion 120 are formed. The opened top of the housing 100 is closed by the cover 200.

The motor accommodating portion 110 has a depth that may accommodate the motor 300 and may have a cylindrical shape with an open top. Accordingly, the motor 300 may be inserted and mounted through the open top of the motor accommodating portion 110.

A damper member 140 that supports a lower end of the motor 300 may be provided on a bottom surface of the motor accommodating portion 110.

The gear accommodating portion 120 may be provided adjacent to the opened top of the motor accommodating portion 110 in a horizontal direction. The gear accommodating portion 120 may accommodate the reduction device 600, and include an extension panel 126 coupled to a gear mounting part 623 of the reduction device 600 to be described later. The gear accommodating portion 120 may be provided in a vertically open form in order to output a rotational force reduced through the reduction device 600. A structure in which the gear mounting part 623 is coupled to the extension panel 126 will be described again below.

The cover 200 is provided in the form of a box with an open lower side and forms a space therein while being coupled to the housing 100. The cover 200 and the housing 100 may be made of a synthetic resin material. The bracket 400, the power connection unit 500 and the reduction device 600 are fixedly installed in the housing 100, and then the cover 200 is bonded to the housing 100 by ultrasonic, laser welding, etc., thereby easily sealing the inside of the housing 100.

On the other hand, the housing 100 includes a connector unit 130 that supplies power to the motor 130. When the motor 300 is installed in the housing 10, a power terminal 330 of the motor 300 may be provided to be connected to a terminal tap 133 of the connector unit 130.

Power transmission from the motor 300 to the reduction device 600 is performed by the power connection unit 500.

The power connection unit 500 directly connects the motor 300 and the reduction device 600 to transmit the rotational force of the motor 300. To this end, the power connection unit 500 may be provided between the motor 300 and the reduction device 600. More specifically, the power connection unit 500 includes a power transmission shaft 530 having a predetermined length, a first helical gear 510 coupled to a rotation shaft of the motor 300, a second helical gear 520 that installed one end of the power transmission shaft 530 and meshed with the first helical gear 510, and a bearing portion 540 that provided on the power transmission shaft 530 to rotatably support the power transmission shaft 530. In this case, the bearing portion 540 may be arranged between the first helical gear 510 and the second helical gear 520 and supported by the bracket 400. Furthermore, at the other end of the power transmission shaft 530 may be provided a first bevel gear part 611 of a first reduction gear unit 610 to be described later.

The first helical gear 510 rotates while a center thereof is coupled to the rotation shaft of the motor 300. The second helical gear 520 meshed with the first helical gear 510 rotates while changing a rotational direction to a direction perpendicular to the rotation shaft of the motor 300. Changing the rotational direction using the helical gears may reduce noise considerably because a meshing rate is better than that of a spur gear. In addition, when adjusting a gear ratio, it may also be used as a deceleration function.

The reduction device 600 includes the first reduction gear unit 610 connected to the power connection unit 500, and a second reduction gear unit 620 connected to the first reduction gear unit 610.

The first reduction gear unit 610 may be provided as a bevel gear assembly. More specifically, the first reduction gear unit 610 includes the first bevel gear part 611 provided at the other end of the power transmission shaft 530 and a second bevel gear part 612 meshing with the first bevel gear part 611.

The first bevel gear part 611 may include gear tooth formed on an outer surface of the other end of the power transmission shaft 530. Accordingly, the first bevel gear part 611 rotates in the same rotational direction as the power transmission shaft 530 and transmits the rotational force to the second bevel gear part 612. Herein, the first bevel gear part 611 is shown and described as formed on the outer surface of the power transmission shaft 530 by processing a conical shape having gear tooth, but is not limited thereto. In other words, the first bevel gear part 611 may be formed a separate conical gear and coupled to the power transmission shaft 530.

The second bevel gear part 612 is meshed with the first bevel gear part 611 and rotates. The second bevel gear part 612 converts a rotational direction to a vertical direction. In other words, the rotational direction is changed to a direction parallel to the rotation shaft of the motor 300. The second bevel gear part 612 may be formed in a cylindrical shape with an open lower portion so as to have an accommodating space S1 therein. Furthermore, the second bevel gear part 612 includes gear tooth meshed with the first bevel gear part 611 along an upper surface edge in order to mesh with the first bevel gear part 611. Accordingly, the second bevel gear part 612 is engaged with the first bevel gear part 611 on an upper side of the second bevel gear part 612 to rotate.

The second reduction gear unit 620 includes a sun gear 621 rotating together with the second bevel gear part 612, a plurality of planetary gears 622 meshed with an outer side of the sun gear 621, the gear mounting part 623 provided with a ring gear 624 on an inner circumference thereof to accommodate the plurality of planetary gears 622, and a carrier 628. The career 628 rotatably supports the plurality of planetary gears 622 and is installed to rotate coaxially with the sun gear 621 and outputs rotational power. In this case, three planetary gears 622 are arranged in the form of surrounding the sun gear 621.

The sun gear 621 is provided in the accommodating space S1 of the second bevel gear part 612. More specifically, the sun gear 621 may be integrally formed with the second bevel gear part 612 at a lower center of the second bevel gear part 612. Furthermore, the sun gear 621 may be installed at the lower center of the second bevel gear part 612 to rotate together with the second bevel gear part 612.

The plurality of planetary gears 622 is provided in three in consideration of efficiency and economic feasibility, and those are respectively rotatably provided on branch shafts 628a in three directions branched from the carrier 628.

The gear mounting part 623 has a shaft hole 625 penetrating vertically in a center thereof, and the ring gear 624 is provided along a circumferential direction on the inner surface of the gear mounting part 623. The ring gear 624 may be formed integrally with the gear mounting part 623.

The second bevel gear part 612 may be rotatably supported above the gear mounting part 623. For example, the accommodating space S1 of the second bevel gear part 612 may have a shape corresponding to the gear mounting part 623. Accordingly, the gear mounting part 623 is arranged in the accommodating space S1 of the second bevel gear part 612. In other words, the second bevel gear part 612 is provided to cover an upper surface and side surface of the gear mounting part 623. Accordingly, when the second bevel gear part 612 is covered the upper portion of the gear mounting part 623, the sun gear 621 is arranged in an inner space S2 of the gear mounting part 623 through the shaft hole 625 of the gear mounting part 623.

Furthermore, the gear mounting part 623 is provided in a hollow cylindrical shape with an open lower portion and may be detachably coupled to the extension panel 126 formed in the gear accommodating portion 120. A plurality of hooks 626 may be provided at a lower end of the gear mounting part 623 to be detachably attached to the extension panel 126.

Furthermore, to stably couple the gear mounting part 623 to the extension panel 126, the extension panel 126 may be provided with a plurality of locking ribs 127 spaced apart from each other by a predetermined distance along a circumferential direction thereof, and a plurality of coupling ribs 627 engaged with the plurality of locking ribs 127 may protrude from a lower outer circumferential surface of the gear mounting part 623.

When the gear mounting part 623 is mounted on the extension panel 126, the plurality of hooks 626 is inserted and bound to a plurality of hooking grooves 126a formed in the extension panel 126, and the rotation of the gear mounting part 623 is restricted by mutual engagements of the plurality of locking ribs 127 and the plurality of coupling ribs 627.

On the other hand, although the gear mounting part 623 is shown and described as being detachably provided on the extension panel 126, the embodiment of the disclosure is not limited thereto, and may be integrally formed with the housing 100.

The carrier 628 may be formed in a disk shape, and a plurality of planetary gear branch shafts 628a spaced apart from each other by a predetermined distance along a circumferential direction thereof is provided on an upper surface of the carrier 628. A carrier shaft part 628b extending upward through the shaft hole 625 of the gear mounting part 623 is provided in a center of the upper surface of the carrier 628, and an output gear 629 is provided in a center of a lower surface thereof. At this time, the output gear 629 may be integrally formed with the carrier 628 and rotate together.

When the carrier 628 is coupled to the gear mounting part 623, the carrier shaft part 628b passes through the centers of the second bevel gear part 612 and the sun gear 621 and then is rotatably coupled to the shaft support hole formed in the cover 200.

When the reduction device 600 as described above is mounted on the gear accommodating portion 120, the gear mounting part 623 may be accommodated in the accommodating space S1 of the second bevel gear part 612 and the plurality of planetary gears 622 that are arranged to mesh with the sun gear 621 and the ring gear 624 may be provided to be rotatable in and the inner space S2 of the gear mounting part 623, thereby implementing compact coupling structure.

Hereinafter, operation of the actuator for a brake according to an embodiment of the disclosure will be described.

When a driver operates a parking brake after stopping a vehicle, the motor 300 is driven to rotate the rotation shaft of the motor 300. As a result, the first helical gear 510 coupled to the rotation shaft of the motor 300 rotates together to rotate the second helical gear 520 coupled to the first helical gear 510.

As the power transmission shaft 530 rotates together with the second helical gear 520, the second bevel gear part 612 meshed with the gear tooth of the first bevel gear part 611 formed on the power transmission shaft 530 rotates.

The sun gear 621 is provided on the inner lower side of the second bevel gear part 612 and rotates together with the second bevel gear part 612 to transmit the rotational force to the plurality of planetary gears 622, and the plurality of planetary gears 622 orbit around the sun gear 621 along the ring gear 624 provided along the inner circumference of the gear mounting part 623.

As the carrier 628 is rotated by the plurality of planetary gears 622 orbiting in this way, the output gear 629 is rotated.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An actuator for a brake device, comprising:
   a housing including:
      a motor accommodating portion configured to accommodate a motor, and
      a gear accommodating portion configured to accommodate a reduction device;
   a power connection unit connected to the motor; and
   wherein the reduction device is connected to the power connection unit;
   wherein the reduction device includes a first reduction gear unit connected to the power connection unit and a second reduction gear unit connected to the first reduction gear unit, and
   the first reduction gear unit comprises a bevel gear assembly,
   wherein the power connection unit comprises:
      a power transmission shaft having a predetermined length and provided between the motor and the reduction device;
      a first helical gear coupled to a rotation shaft of the motor;
      a second helical gear installed at a first end of the power transmission shaft and meshed with the first helical gear; and
      a bearing portion provided on the power transmission shaft to rotatably support the power transmission shaft,
   wherein the first reduction gear unit comprises:
      a first bevel gear part provided at a second end of the power transmission shaft opposite to the first end of the power transmission shaft; and
      a second bevel gear part that formed in a cylindrical shape with an open lower portion that forms an accommodating space thereinside, the second bevel gear part including second bevel gear teeth along an upper surface edge thereof, the second bevel gear teeth meshed with the first bevel gear part along an upper surface edge thereof, wherein the second reduction gear unit comprises:
      a sun gear coupled to a lower center of the second bevel gear part to rotate together with rotation of the second bevel gear part;
      a plurality of planetary gears meshed with an outer side of the sun gear;
      a gear mounting part provided with a ring gear only on an inner circumference thereof to accommodate the plurality of planetary gears; and
      a carrier that rotatably supports the plurality of planetary gears and that is installed to rotate coaxially with the sun gear, the carrier provided with an output gear for outputting rotational power,
   wherein:
   the gear accommodating portion comprises an extension panel to which the gear mounting part is coupled,
   the gear mounting part comprises a plurality of hooks at a lower end of the gear mounting part, the plurality of hooks configured to be detachably attached to a hooking groove located in the extension panel,
   the extension panel comprises a plurality of locking ribs spaced apart from each other by a predetermined distance along a circumferential direction thereof, and
   the gear mounting part comprises a plurality of coupling ribs that are configured to be engaged with respective ones of the plurality of locking ribs, the plurality of coupling ribs protruding from a lower outer circumferential surface of the gear mounting part.

2. The actuator of claim 1, wherein the first bevel gear part includes gear tooth formed on an outer surface of the other end of the power transmission shaft.

3. The actuator of claim 1, wherein
   the gear mounting part is accommodated in the accommodating space of the second bevel gear part, and
   the plurality of planetary gears that are arranged to mesh with the sun gear and the ring gear is rotatably provided in an inner space of the gear mounting part.

4. The actuator of claim 1, further comprising a bracket configured to support the power connection unit from an upper side of the motor, and a cover configured to cover a top of the housing.

* * * * *